Patented Oct. 8, 1929

1,730,505

UNITED STATES PATENT OFFICE

RUSSELL HART, OF SANTA MONICA, CALIFORNIA

PHOTO-ELECTRIC CELL

No Drawing.    Application filed January 30, 1928.   Serial No. 250,715.

This invention has for its principal object, the sensitizing of a photo-electric substance to some color to which it is normally slow and not very sensitive. A definite object it has accomplished is to make a selenium cell sensitive and very rapid to extreme infra-red rays.

My invention consists in treating the selenium or other photo-electric substance with a suitable dye to effect the desired color sensitivity and speed.

I was familiar with the use of various dyes to make the silver photographic plate sensitive to various colors. It occurred to me that photo-electric substances and in particular selenium might be affected in a similar manner. I procured a number of dyes and pigments and obtained some positive results and since I was very desirous of making my selenium cells sensitive and rapid to infra-red rays, I confined my efforts to dyes likely to give me this result. My first tests were with the pigment vermilion which gave slight increase in the red sensitivity. The next test was with the dye pinacyanol which further increased the red sensitivity. I then tried the dye dicyanine which gave infra red sensitivity and speed. The dye neocyanine gave even better results than dicyanine. All the above dyes were used in ethyl alcohol solution.

I then noticed that all of the above dyes contained iodine and reasoned that an alcoholic solution of iodine might give results. I prepared a saturated solution of iodine in ethyl alcohol and obtained better results than I procured with any of the above dyes. After this solution stood in the laboratory for several days I obtained still better results. This fact seems to indicate that the action is partly due to alkyl iodine compounds.

My preferred method at present to make a selenium cell sensitive to infra-red rays is to sublime the selenium upon the grid of cell as described in my U. S. Patent #1,491,040 in an atmosphere having at least 70% humidity and a barometric pressure of not over 750 millimeters. If the cell is tested at this stage it will be found to be sensitive to ordinary light but will not have much sensitivity or speed, if any, to infra-red rays. I now apply a saturated solution of iodine in an alcohol such as methyl, ethyl etc., which has preferably been aged for several days, to the selenium crystals with a brush while at room temperature and seal the cell in a chamber containing a drying agent such as calcium chloride. After curing for a few days, the cell will respond to over 10,000 light impulses per second using an extra dark infra-red filter. I sometimes remove the excess iodine from the selenium crystals by washing in an alcohol.

I have noticed that when the color of the selenium crystals obtained by sublimation are grey, after the iodine solution is applied and then removed by washing with an alcohol the color of the crystals change and show a violet tinge. This seems to indicate that the iodine causes a molecular change in the selenium.

I have made cells by the above process which are six months old and they retain their infra-red sensitivity and speed and are very reliable. They should not be exposed to strong actinic light except through filter.

I claim:

1. A selenium cell containing iodine.
2. The process of subliming selenium upon a grid and subjecting said selenium to the action of iodine in the manufacture of photoelectric cells.
3. The process of subliming selenium upon a grid and subjecting said selenium to the action of an alcoholic solution of iodine in the manufacture of photoelectric cells.
4. The process of applying selenium to a grid and subjecting said selenium to the action of iodine in the manufacture of photoelectric cells.
5. The process of applying selenium to a grid and subjecting said selenium to the action of a compound of iodine in the manufacture of photoelectric cells.
6. The process of applying selenium to a grid and dyeing said selenium with a dye containing iodine in the manufacture of photoelectric cells.

RUSSELL HART.